(12) United States Patent
Burch et al.

(10) Patent No.: US 10,380,331 B2
(45) Date of Patent: Aug. 13, 2019

(54) DEVICE AUTHENTICATION

(71) Applicant: NetIQ Corporation, Provo, UT (US)

(72) Inventors: Lloyd Leon Burch, Payson, UT (US); Baha Masoud, Orem, UT (US)

(73) Assignee: NetIQ Corporation, Provo, UT (US)

( * ) Notice: Subject to any disclaimer, the term of this patent is extended or adjusted under 35 U.S.C. 154(b) by 118 days.

(21) Appl. No.: 14/513,441

(22) Filed: Oct. 14, 2014

(65) Prior Publication Data

US 2016/0103989 A1 Apr. 14, 2016

(51) Int. Cl.
*G06F 21/31* (2013.01)

(52) U.S. Cl.
CPC .................... *G06F 21/31* (2013.01)

(58) Field of Classification Search
CPC .......... G06F 21/44; G06F 3/016; G06F 21/31; G06F 3/0481; G06F 2221/2129
See application file for complete search history.

(56) References Cited

U.S. PATENT DOCUMENTS

| 8,009,147 | B2 | 8/2011 | Chang et al. | |
|---|---|---|---|---|
| 8,339,374 | B2 | 12/2012 | Chang | |
| 8,452,978 | B2* | 5/2013 | Alward | G06F 21/316 713/185 |
| 8,533,796 | B1* | 9/2013 | Shenoy | H04L 63/0815 380/229 |
| 8,539,550 | B1* | 9/2013 | Terres | G06F 21/31 726/16 |
| 8,873,147 | B1* | 10/2014 | Rhodes | G02B 27/0172 359/630 |
| 9,147,059 | B2* | 9/2015 | Isbister | G06F 21/32 |
| 9,194,955 | B1* | 11/2015 | Fahrner | G01S 19/16 |
| 9,537,848 | B2* | 1/2017 | McLaughlin | H04L 63/08 |
| 9,667,609 | B2* | 5/2017 | McLaughlin | H04L 63/08 |
| 2009/0085877 | A1* | 4/2009 | Chang | G06F 3/0488 345/173 |
| 2010/0225443 | A1* | 9/2010 | Bayram | G06F 21/316 340/5.83 |
| 2011/0128243 | A1* | 6/2011 | Murakoshi | G06F 21/32 345/173 |
| 2011/0209087 | A1* | 8/2011 | Guyot-Sionnest | G06F 3/04886 715/799 |
| 2011/0283354 | A1* | 11/2011 | Chang | G06F 3/0488 726/19 |
| 2012/0144198 | A1* | 6/2012 | Har | H04W 12/06 713/170 |
| 2012/0235912 | A1* | 9/2012 | Laubach | G06F 3/04895 345/163 |
| 2012/0235938 | A1* | 9/2012 | Laubach | G06F 3/0416 345/173 |

(Continued)

OTHER PUBLICATIONS

3M, Touch Topics_ Touch Terminology_ What is Multi-Touch, Touch Gesture, Pinch and Expand, 3M 2012, All rights reserved.*

*Primary Examiner* — Jason K Gee
*Assistant Examiner* — Shu Chun Gao
(74) *Attorney, Agent, or Firm* — Schwegman Lundberg & Woessner, P.A.

(57) ABSTRACT

Multi-touch groupings of characters are detected for device authentication and access. In an embodiment, one or more non-character based factors are used in combination with an inputted authentication code (character based) for device authentication and access.

16 Claims, 4 Drawing Sheets

(56) References Cited

U.S. PATENT DOCUMENTS

| | | | |
|---|---|---|---|
| 2013/0086666 A1* | 4/2013 | Cheng | G06F 21/32 |
| | | | 726/7 |
| 2013/0097673 A1* | 4/2013 | Meehan | G06Q 20/341 |
| | | | 726/4 |
| 2014/0109217 A1* | 4/2014 | Park | G06F 21/44 |
| | | | 726/17 |
| 2014/0137234 A1 | 5/2014 | Chin | |
| 2015/0073583 A1* | 3/2015 | Karl | G05B 19/188 |
| | | | 700/180 |
| 2015/0199504 A1* | 7/2015 | Feng | G06F 21/36 |
| | | | 726/28 |
| 2015/0278492 A1* | 10/2015 | Tungare | G06F 21/31 |
| | | | 726/19 |
| 2015/0293695 A1* | 10/2015 | Schonleben | G06F 3/04886 |
| | | | 345/173 |
| 2016/0014261 A1* | 1/2016 | Cudak | H04M 1/67 |
| | | | 455/411 |
| 2016/0188205 A1* | 6/2016 | Rao | H04L 63/08 |
| | | | 715/773 |

* cited by examiner

DEVICE AUTHENTICATION

BACKGROUND

Increasingly, consumers are using devices to perform a variety of transactions that are sensitive in nature, such as financial and personal. Thus, security for accessing these devices has become extremely important to the consumer and as a result the industry at large that sell products and services to the consumer.

For example, Personal Identification Number (PIN) codes are being deployed in more and more devices and applications beyond just the conventional Automated Teller Machine (ATM) applications for which PIN codes were originally associated with. In most cases, PIN codes are limited to four numeric values that are entered into a device by pressing one alphanumeric code at a time in a predefined sequence. Such application, limits the number of possible entries to about 10,000 and may also be easy for an eavesdropper to see when in proximity to a consumer entering a PIN code In fact, in mobile device applications, the User Interface (UI) strives to limit the number of key strokes to a bare minimum for a PIN code of a consumer.

These situations for PIN code definition and PIN code entry create unnecessary security and UI problems.

SUMMARY

Various embodiments of the invention provide techniques for device authentication and access. In an embodiment, a method for device authentication is presented.

Specifically, multiple inputs associated with an access code are obtained by a device; at least one of the inputs is a single multi-touch input comprised of multiple simultaneously pressed characters. Next, the multiple inputs are authenticated to determine whether access is to be granted or denied.

DETAILED DESCRIPTION

A "processing environment" defines a set of cooperating computing resources, such as machines (processor and memory-enabled devices), storage, software libraries, software systems, etc. that form a logical computing infrastructure. A "logical computing infrastructure" means that computing resources can be geographically distributed across a network, such as the Internet. So, one computing resource at network site X and be logically combined with another computing resource at network site Y to form a logical processing environment.

The phrases "processing environment," "cloud processing environment," and the term "cloud" may be used interchangeably and synonymously herein.

Moreover, it is noted that a "cloud" refers to a logical and/or physical processing environment as discussed above.

Various embodiments of this invention can be implemented as enhancements within existing network architectures and network-enabled devices.

Also, the techniques presented herein are implemented in (and reside within) machines, such as processor(s) or processor-enabled devices (hardware processors). These machines are configured and programmed to specifically perform the processing of the methods and system presented herein. Moreover, the methods and system are implemented and reside within a non-transitory computer-readable storage media or machine-readable storage medium and are processed on the machines (processors) configured to perform the methods.

Of course, the embodiments of the invention can be implemented in a variety of architectural platforms, devices, operating and server systems, and/or applications. Any particular architectural layout or implementation presented herein is provided for purposes of illustration and comprehension of particular embodiments only and is not intended to limit other embodiments of the invention presented herein and below.

It is within this context that embodiments of the invention are now discussed within the context of the FIGS. 1A-1C and 2-4.

Figure 1A:
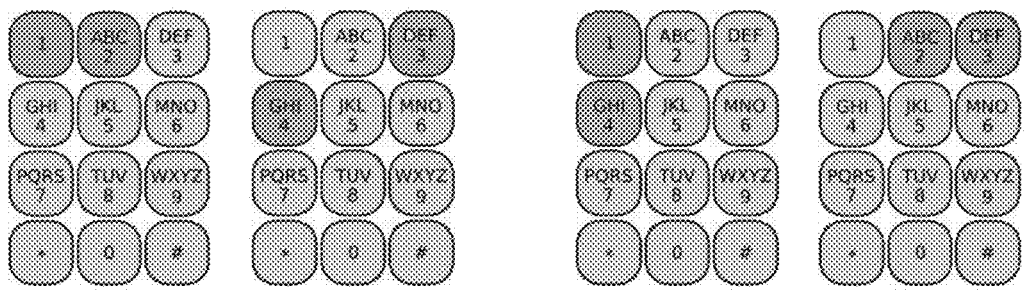
FIG. 1A-1C are diagrams depicting some example PIN code entries and entry sequences, according to an example embodiment.
Figure 1B:
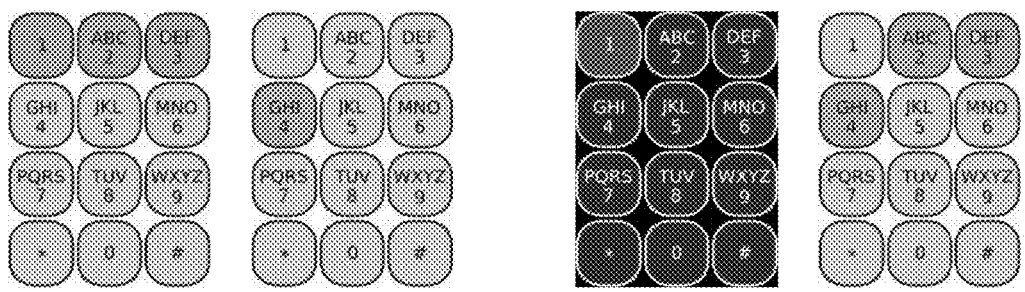
Figure 1C:
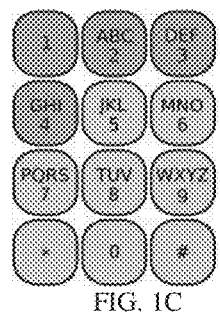

FIGS. 1A-1C are diagrams depicting some example PIN code entries and entry sequences, according to an example embodiment.

The processing associated with authentication the example PIN code entries and entry sequences depicted in the FIGS. 1A-1C are implemented as executable instructions in memory and/or non-transitory computer-readable storage media and executed by one or more processors of a device, where the processor is specifically configured to execute the instructions.

The example device for which authentication is processed in the FIGS. 1A-1C is a mobile device, such as a mobile phone, a tablet, and/or a wearable processing device. However, it is to be noted that the device authentication does not have to always be a mobile device because any device with a keyboard entry mechanism, such as a Personal Computer (PC) or laptop computer, typically allows more than one key to be read at a time. For example, a PC keyboard typically sends a "KeyDown" code and a "KeyUp" code for each key of the keyboard, such that multiple depressed and released keys can be read at once.

Some processing scenarios for the device authentication techniques are now discussed with reference to the FIG. 1A-1C.

Most mobile devices allow a user to interact with his/her device by using a multi-touch interface. This means that the device can detect more than one figure or touch on the device at a single time. The multi-touch feature relays information to a device application in response to the multi-touch. For example, some mobile devices permit two figures to touch an area of the touch screen simultaneously and have the fingers move apart from one another (pinch out for zooming) or move towards one another (pinch in for panning out).

The existing multi-touch capabilities are enhanced herein for purposes of defining device authentication codes, such as PINs, passwords, passcodes, and the like.

The FIGS. 1A-1C depict three example scenarios of how multi-touch features are enhanced for device authentication. It is noted that other scenarios exist as well, some of which are described herein and below.

Consider a PIN of a user of a mobile device (phone, tablet, wearable processing device, etc.) identified by 4 alphanumeric characters as 1, 2, 3, 4. In a typical scenario, the user presses each alphanumeric character one at a time and in sequence resulting in 4 individual and separate touches on the touch screen interface of the mobile device.

This typical scenario is enhanced herein permitting the user to define and use multi-touch authentication codes. That is more than one alphanumeric character is touched by the user at a single time.

FIG. 1A shows two separate scenarios, where the PIN 1, 2, 3, and 4 is set (and subsequently used for device authentication and access) by simultaneously pressing the keys 1 and 2 together followed by the pressing the keys 3 and 4 together (shown as the first two keypads to the left in the FIG. 1A). Here, the user made two multi-touches and each touch was a multi-touch that included two simultaneously pressed alphanumeric characters.

The second scenario of the FIG. 1A is shown as the two keypads to the right where the user again makes two touches. The first multi-touch includes pressing keys 1 and 4 simultaneously and the second multi-touch includes pressing keys 2 and 3 simultaneously.

FIG. 1B shows two separate scenarios for the PIN (1, 2, 3, 4) where a single multi-touch is made along with a single touch to set or input the PIN for device authentication and access. In the first scenario, the user simultaneously presses the keys 1, 2, and 3, and then makes a single touch to key 4. In the second scenario (the two keypads to the right), the user makes a first single touch to the key 1 and then simultaneously presses keys 2, 3, and 4 simultaneously.

FIG. 1C shows a scenario where the user makes a single multi-touch to define or input the PIN (1, 2, 3, 4) for device authentication and access. Here, the user presses the keys 1, 2, 3, and 4 simultaneously with a single multi-touch.

In the example a simple 4 digit PIN was presented but because multi-touch is permitted the number of possible PIN combinations is more than doubled. It is also noted that the number of key presses can also be decreased.

In an embodiment, the order that the keys are pressed in each grouping is not relevant to device authentication and access; rather, the key touches are grouped into a combination, such that when the first key pressed is released the keys in the combination is considered to be complete. So, if key 1 is pressed and then the keys 2, 3, 4 are pressed and then key 1 is depressed released, the key combination in the group is defined as 1, 2, 3, 4. Similarly, if the key 2 is pressed and then keys 1, 4, 3 are pressed and then key 2 is depressed or released, the key combination in the group is also 1, 2, 3, 4 (in that order).

In another embodiment, to order of key touches is relevant to device authentication and access. So, in the example of the previous embodiment, there are two separate authentication scenarios one identified by 1, 2, 3, 4, and one identified by 2, 1, 4, 3. In an embodiment, a user can define multiple combinations of touches for a valid access to the device, such that 1, 2, 3, 4 and 2, 1, 4, 3 are valid for access but other combinations are invalid for access. In an embodiment, the user can define a single combination as being required for a valid access to the device.

In an embodiment, the key combinations can be comprised of single digits (0-9), multi-digits, or a combination of single and multi-digits. So, a PIN can include 4 multi-digit alphanumeric characters, such as 12, 34, 56, 789. An example entry for such a PIN may include the user pressing and holding key 1 and pressing key 2 then releasing keys 1 and 2, pressing and holding key 3 and pressing key 4, then releasing keys 3 and 4, pressing and holding key 5 and pressing key 6, then releasing keys 5 and 6, and finally pressing and holding keys 7, 8, and 9 and then releasing keys 7, 8, and 9.

In another aspect of the techniques presented herein, additional authentication information can be part of the PIN that is not an alphanumeric entry. In some cases, user input can be part of the data entry. For example, the angle at which the device is held when all or just a portion of the PIN is entered can be part of what is considered to be a valid PIN entry. So, the device may require that the device is held parallel, vertical, or at a 45 degree to the surface of the earth. Again, this requirement can be for a single digit entered by the user, for a grouping of digits entered by the user, or for all of the digits entered by the user for the PIN. Another, factor other than orientation of the device relative to the earth may be a current view mode that the device is in when the PIN or pieces of the PIN are entered, such as portrait or landscape viewing mode. In fact, any detectable device state or position can be used as a factor when the PIN or pieces of the PIN are entered for purposes of authenticating the device for access with the PIN.

In still another embodiment, a non-keystroke factor used as input for device authentication when the PIN or pieces of the PIN are entered is G-force. This can be in the form of device shaking, or movement in a single direction. This may also be a condition in which the device must remain still for a defined period of time. These G-force factors can be before, during, or after the PIN is inputted by the user. For example, the user inputs a first digit (can be a multi-touch grouping of digits or multiple digits as well) and then shakes the device, then the user tilts the device to a vertical position and enters a second digit (can also be a multi-touch grouping of digits or multiple digits as well), and then the user tilts the device to horizontal position relative to the surface of the earth and holds it there for 2 seconds, and finally the user enters two more digits and shakes the device again.

In another embodiment, verification of the PIN includes environmental conditions of the device as well, which are used for a valid PIN enter for device authentication and access. The environmental conditions can be anything that the device can detect, such as but not limited to: Global Positioning Satellite (GPS) location of the device, Wi-Fi Service Set Identifiers (SSIDs) detectable in range of the device, time of day, sound from a microphone of the device, video/light from the camera of the device (such as user placing finger over the camera of the device to darken it), and the like.

Failure of a PIN entry (including any non-alphanumeric factors) may deny access to the device or may require a different form of authentication of the operator, such as an explicit user name and password, answering security questions, etc.

In an embodiment, the user is provided an interface to select factors to use with a valid PIN. For authentication, the user inputs the PIN with the factors. Some selection of some factors may require additional input from the user, such as when the GPS factor is used, the interface may prompt the user with a question such as "how far can this device be from here or from the location used with the GPS factor" or when the Wi-Fi factor is used the interface may prompt the user to "select or enter the name of the Wi-Fi networks that are required for PIN authentication."

The techniques presented above and below:

1) provide a larger set of possible key combination that can be used with the same entry device and same number of available digits;

2) provide faster or quicker PIN entry by the user;

3) make it more difficult to eavesdrop ("shoulder surf") a user's PIN entry;

4) allow users to enter PINs grouped as they remember then, for example if a birthdate is used, such as 10/23/62, the PIN can be entered as 12, 23, 62 and not 102362 (single number) and the grouping actually adds security to the PIN entered; and 5) add complexity to a PIN without creating undue burden on the user.

Figure 2:
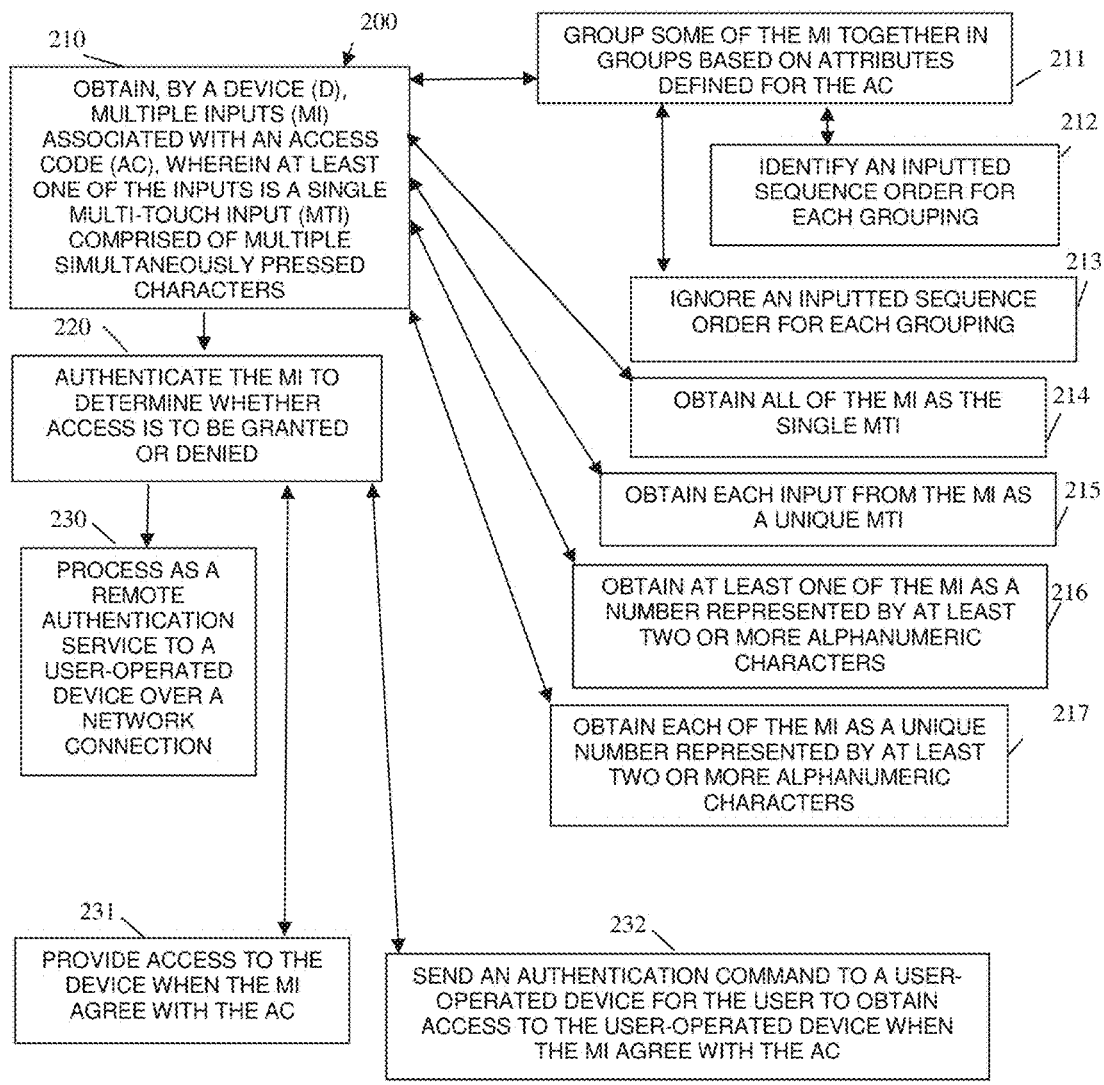
FIG. 2 is a diagram of a method for device authentication, according to an example embodiment.
Figure 3:
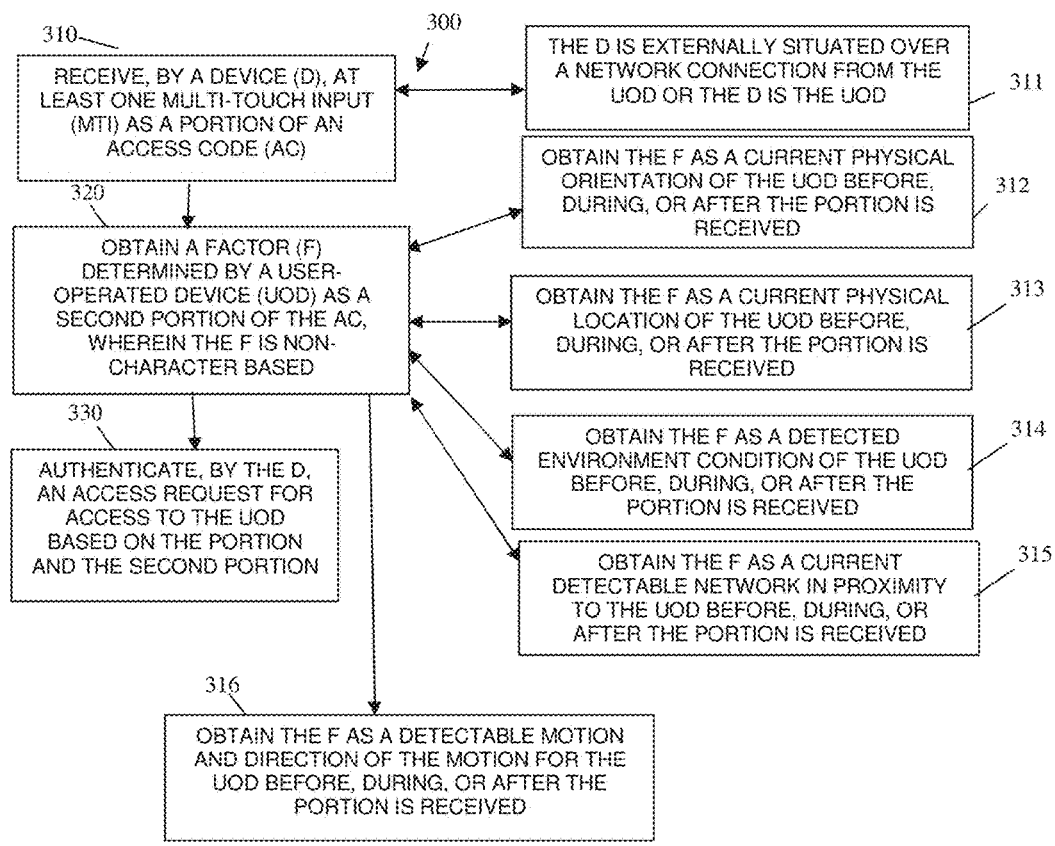
FIG. 3 is a diagram of another method for device authentication, according to an example embodiment.
Figure 4:
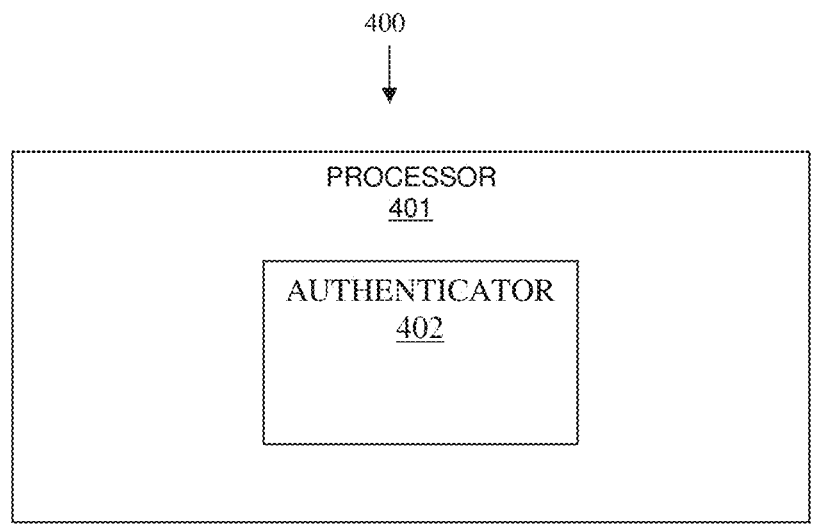
FIG. 4 is a diagram of a device authentication system, according to an embodiment.

Aspects of the embodiments discussed above and other embodiments are now presented with the discussion of the FIGS. 2-4.

FIG. 2 is a diagram of a method 200 for device authentication, according to an example embodiment. The method 200 is implemented as one or more software modules (herein after referred to as "device access authenticator"). The device access authenticator includes executable instructions that are implemented, programmed, and resides within memory and/or a non-transitory machine-readable storage media; the executable instructions execute on one or more processors of a server device and have access to one or more network connections associated with one or more networks. The networks may be wired, wireless, or a combination of wired and wireless.

In an embodiment, the device access authenticator processes on a mobile device as a mobile application (mobile app).

In an embodiment, the device access authenticator processes on a PC and/or laptop computer.

In an embodiment, the device access authenticator processes remotely on a server and/or cloud processing environment. In this embodiment, the device access authenticator receives entry factors from the device for which access is being requested and being operated by a user/principal over a network connection and the device access authenticator performs authentication and sends a response (trusted by the user device) to either permit user access (indicating successful device authentication) or to deny user access (indicating failure of device authentication).

Thus, in one case the device access authenticator processes on the device for which a user is attempting to gain access to and operate. In another case, the device access authenticator processes externally and remotely from the device for which the user is attempting to gain access to and operate.

At 210, the device access authenticator obtains multiple inputs associated with an access code. At least one of the inputs is a single multiple-touch comprised of multiple simultaneous pressed characters. It is noted that "simultaneously pressed" may include pressing one key and holding it pressed down while one or more other characters are pressed, such that multiple keys are pressed at once and released at once or at simultaneously the same time. This was discussed above with reference to the FIGS. 1A-1C.

According to an embodiment, at 211, the device access authenticator groups some of the multiple inputs together in groups based on attributes defined for the access code. That is, when the access code is defined groupings of inputs can be identified as attributes associated with the access code, such that the device access authenticator can group in accordance with the attributes.

In an embodiment of 211 and at 212, the device access authenticator identifies an inputted sequence order for each grouping. That is, each grouping is identified and entered in a sequence and that sequence is noted as it may be used as a requirement for authentication in accordance with attributes associated with the access code.

In an embodiment of 211 and at 213, the device access authenticator ignores any inputted sequence order for each of the groupings. This is a situation where the attributes of the access code does not consider the sequence order to be of any significance in authentication for access.

According to an embodiment, at 214, the device access authenticator obtains all of the multiple inputs as the single multi-touch input. This is a scenario discussed with FIG. 1C above where the entire access code (such as a PIN) is pressed altogether at one time.

In an embodiment, at 215, the device access authenticator obtains each input from the multiple inputs as a unique multi-touch input. So, each input is a multiple touch input including multiple characters.

In an embodiment, at 216, the device access authenticator obtains as least one of the multiple inputs as a number represented by at least two or more alphanumeric characters (a number having two or more digits) as discussed above with reference to the FIGS. 1A-1C.

In an embodiment, at 217, the device access authenticator obtains each of the multiple inputs as a unique number represented by at least two or more alphanumeric characters (each inputted number is two or more digits and each inputted number inputted at once using a single multiple touch input).

At 220, the device access authenticator authenticates the multiple inputs to determine whether access is to be granted or denied.

According to an embodiment, at 221, the device access authenticator provides access to the device that executes the device access authenticator when the multiple inputs agree (match) with the access code needed for access to the device. Here, the device access authenticator is an application or service that executes on the device to which the user desires access.

In an embodiment, at 222, the device access authenticator sends an authentication command or token (signed, encrypted, unsigned, and/or not encrypted) to a user-operated device when the multiple inputs agree (match) with the access code needed for access to the device. Here, the multiple inputs are obtained in 210 by the device access authenticator over a network connection as inputted on the user-operated device by the user.

In an embodiment, at 230, the device access authenticator processes as a remote authentication service to a user-operated device over a network connection (wired, wireless, or a combination of wired and wireless).

FIG. 3 is a diagram of another method 300 for device authentication, according to an example embodiment. The method 300 is implemented as one or more software module(s) (herein after referred to as "multifactor device authenticator") on a device. The multifactor device authenticator is represented as executable instructions that are implemented, programmed, and resides within memory and/or a non-transitory machine-readable storage medium; the executable instructions execute on one or more processors of the device and have access to one or more network connections associated with one or more networks. The networks may be wired, wireless, or a combination of wired and wireless.

In an embodiment, the multifactor device authenticator presents another perspective of the device access authenticator of the FIG. 2 with enhanced multifactor authentication capabilities.

In an embodiment, the multifactor device authenticator processes on a mobile device.

In an embodiment, the multifactor device authenticator processes on a PC or a laptop computer.

In an embodiment, the multifactor device authenticator processes on a server or cloud processing environment that is remote and external to a user device for which a user is operating and attempting to authenticate to and gain access to.

At 310, the multifactor device authenticator receives, at the device that processes the multifactor device authenticator, at least one multi-touch input as a portion of an access code.

At 320, the multifactor device authenticator obtains a factor determined by a user-operated device as a second portion of the access code. The factor is a non-character based; that is not inputted via an interface by the user. The user may cause the factor to be determined but the user does not use a keypad or touch based entry mechanism to supply the factor.

For example, at 321, the multifactor device authenticator obtains the facto as a current physical orientation of the user-operated device before, during, or after the portion (multi-touch input) is received. The orientation may include horizontal, vertical, or a defined angle relative to the surface of the earth.

In another case, at 322, the multifactor device authenticator obtains the factor as a current physical location of the user-operated device before, during or after the portion (multi-touch input) is received. The physical location can be defined as a range within a predefined physical location.

In still another situation, at 323, the multifactor device authenticator obtains the factor as a detected environment condition of the user-operated device before, during, or after the portion (multi-touch input) is received. Some environmental conditions can include sound, lighting, and the like as discussed above with reference to the FIG. 1A-1C.

According to an embodiment, at 324, the multifactor device authenticator obtains the factor as a current detectable network in proximity to the user-operated device before, during, or after the portion (multi-touch input) is received. This can include Wi-Fi SSIDs, network names, and the like.

In yet another case, at 325, the multifactor device authenticator obtains the factor as a detectable motion and direction of that motion for the user-operated device before, during, or after the portion (multi-touch input) is received. This may include shaking the user-operated device or swinging it in a certain direction with a certain amount of minimal G-force. The motion may also include stillness or non detectable motion.

According to an embodiment, 330, the device that executes the multifactor device authenticator is externally situated (located remotely) over a network connection from the user-operated device or the device that executes the multifactor device authenticator is the user-operated device.

It is noted that although a variety of factors were discussed in isolation, authentication can include a different one of any of these factors to be detected before, during, or after each portion of the access code is supplied.

FIG. 4 is a diagram of a device authentication system 400, according to an embodiment. Various components of the device authentication system 400 are software module(s) represented as executable instructions, which are programed and/or reside within memory and/or non-transitory computer-readable storage media for execution by one or more devices. The components and the devices have access to one or more network connections over one or more networks, which are wired, wireless, or a combination of wired and wireless.

According to an embodiment, the device authentication system 400 implements, in whole or in part and inter alia, various features of the FIGS. 1A-1C and 2-3. Thus, all processing discussed above with respect to the prior FIGS. are incorporated by reference herein with respect to the device authentication system 400 and the discussion of the FIG. 4.

The device authentication system 400 includes a processor 401 and an authenticator 402.

The processor 401 is part of a device that is remotely located over a network from a user-operated device that a user is authenticating to or the processor 401 is part of the user-operated device.

The authenticator 402 is adapted and configured to: execute on the processor 401 and authenticate an inputted access code to permit access to a user-operated device. The access code includes at least one multi-touch input.

In an embodiment, the authenticator 402 is the method 200 of the FIG. 2.

In an embodiment, the authenticator 402 is the method 300 of the FIG. 3.

In an embodiment, the authenticator 402 is further adapted and configured to authenticate the access code based on a factor associated with the user-operated device. The factor is non-character based input associated with a condition or detectable condition of the user-operated device before, during, or after the access code or a portion of the access code is inputted.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method, comprising:
   obtaining, by a device, multiple inputs associated with an access code, wherein at least one of the inputs is a multi-touch input comprised of multiple pressed characters that are pressed simultaneously as a first combination and at least another of the inputs is a second multi-touch input comprised of additional multiple pressed characters that are pressed simultaneously in a second combination;
   authenticating, by the device, the multiple inputs to determine whether access is to be granted or denied when a first-released character from the multiple pressed characters of the first combination is released and when a second-released character from the additional multiple pressed characters is released, wherein authenticating further includes comparing the first combination and the second combination against the access code for a user-input match, determining a current state or a current position of the device when the first combination and the second combination are entered by a user operating the device as a device factor, comparing the device factor against an expected state or an expected position of the device for a device factor match;
   granting, by the device, access to the device based on a presence of both the user-input match and the device factor match.

2. The method of claim 1, wherein obtaining further includes grouping some of the multiple inputs together in groups based on attributes defined for the access code.

3. The method of claim 2, wherein grouping further includes identifying an inputted sequence order for each grouping.

4. The method of claim 2, wherein grouping further includes ignoring an inputted sequence order for each grouping.

5. The method of claim 1, wherein obtaining further includes obtaining each input from the multiple inputs as a unique multi-touch input.

6. The method of claim 1, wherein obtaining further includes obtaining at least one of the multiple inputs as a number represented by at least two or more alphanumeric characters.

7. The method of claim 1, obtaining further includes obtaining each of the multiple inputs as a unique number represented by at least two or more alphanumeric characters.

8. A non-transitory computer-readable storage medium comprising instructions which when executed by a processor of a device perform a method to:
   obtain multiple inputs associated with an access code including a first input that is a first multi-touch input representing first multiple pressed characters that are pressed simultaneously in a first combination and a second input that is a second multi-touch input representing second multiple pressed characters that are pressed simultaneously in a second combination; and
   authenticate the first input and the second input and determine determining whether an access to the device having the processor is to be granted or denied when a first released input from the first combination is released and when a second released input from second combination is released by comparing the first combination and the second combination against the access code for a user-inputted match, determining a current state or a current position of the device when the first combination and the second combination are entered by a user operating the device as a device factor, comparing the device factor against an expected state or an expected position of the device for a device factor match, and granting the user access to the device based on a presence of both the user-inputted match and the device factor match.

9. The non-transitory computer-readable storage medium of claim 8, wherein the device is one of: a phone, a tablet, a personal computer, a laptop computer, and wearable processing device.

10. The non-transitory computer-readable storage medium of claim 8, wherein the instructions to authenticate further include instructions to include an angle of the device relative to a surface of the earth that the first input and the second input were obtained as the device factor when authenticating for the access to the device.

11. The non-transitory computer-readable storage medium of claim 8, wherein the instructions to authenticate further include instructions to include a viewing mode that the device is in when the first input and the second input were obtained as the device factor when authenticating for access to the device.

12. The non-transitory computer-readable storage medium of claim 8, wherein the instructions to authenticate further includes instructions to include a movement of the device after the first input and the second input were obtained as the device factor when authenticating for access to the device.

13. The non-transitory computer-readable storage medium of claim 12, wherein the movement includes one of: a shaking of the device and a tilting of the device.

14. The non-transitory computer-readable storage medium of claim 8, wherein the instructions to authenticate further includes instructions to include a Global Positioning Satellite (GPS) location of the device when the first input and the second input were obtained as the device factor when authenticating for access to the device.

15. The non-transitory computer-readable storage medium of claim 8, wherein the instructions to authenticate further include instructions to include detectible Wi-Fi Service Set Identifiers (SSIDs) detectable in a wireless range of the device when the first input and the second input were obtained as the device factor when authenticating for access to the device.

16. A device, comprising:
   a non-transitory computer-readable storage medium having instructions; and
   a processor configured to execute the instructions;
   wherein the instructions when executed on the processor are configured to:
      identify a first input as first simultaneously pressed characters and a second input as a second simultaneously pressed characters for an authentication to access the device;
      identify a first combination for the first simultaneously pressed characters when a first one of the first simultaneously pressed characters are released and a second combination for the second simultaneously pressed characters when a first one of the second simultaneously pressed characters are released; and
      process the authentication to determine access to the device based on the first combination and the second combination and at least one factor associated with a state or a position of the device when the first combination and the second combination are entered into the device by a user that is operating the device.

* * * * *